United States Patent
Chiba et al.

(10) Patent No.: US 7,882,347 B2
(45) Date of Patent: Feb. 1, 2011

(54) IMAGE PRINTING DEVICE, VERIFYING DEVICE, AND PRINTED MATERIAL

(75) Inventors: Hirotaka Chiba, Kawasaki (JP); Tsugio Noda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1218 days.

(21) Appl. No.: 11/442,240

(22) Filed: May 30, 2006

(65) Prior Publication Data

US 2007/0083764 A1    Apr. 12, 2007

(30) Foreign Application Priority Data

Oct. 12, 2005  (JP) .............................. 2005-297447

(51) Int. Cl.
*H04L 9/32* (2006.01)
(52) U.S. Cl. ...................... 713/156; 713/168
(58) Field of Classification Search ................... None
See application file for complete search history.

(56) References Cited

U.S. PATENT DOCUMENTS

| 6,748,533 | B1 * | 6/2004 | Wu et al. | 713/176 |
| 6,808,118 | B2 * | 10/2004 | Field | 235/494 |
| 7,260,239 | B2 * | 8/2007 | Eguchi | 382/100 |
| 2004/0158724 | A1 | 8/2004 | Carr et al. | |
| 2005/0129326 | A1 | 6/2005 | Matama | |

FOREIGN PATENT DOCUMENTS

| EP | 1 480 163 | 11/2004 |
| JP | 3-185585 | 8/1991 |
| JP | 10-275203 | 10/1998 |
| JP | 2000-244725 | 9/2000 |
| JP | 2001-86319 | 3/2001 |
| JP | 2001-94755 | 4/2001 |
| JP | 2001-126046 | 5/2001 |
| JP | 2002-304627 | 10/2002 |
| JP | 2004-13378 | 1/2004 |
| JP | 2004-349879 | 12/2004 |
| JP | 2005-159438 | 6/2005 |
| JP | 2005-176230 | 6/2005 |

OTHER PUBLICATIONS

European Search Report issued in European Patent Application No. 06114692.4 dated Jul. 2, 2007.
Office Action issued in Japanese Patent Application No. 2005-297447 mailed Jul. 3, 2007.
Decision of Rejection (Officer Action) in corresponding Japanese Patent Application No. 2005-297447 mailed Oct. 23, 2007.

* cited by examiner

*Primary Examiner*—Pramila Parthasarathy
(74) *Attorney, Agent, or Firm*—Fujitsu Patent Center

(57) ABSTRACT

An image is split into a plurality of blocks, a feature quantity is extracted from each of the blocks, data is embedded into each of the blocks based on a difference between feature quantities of that block and at least one adjacent block, and data embedded blocks are printed.

8 Claims, 13 Drawing Sheets

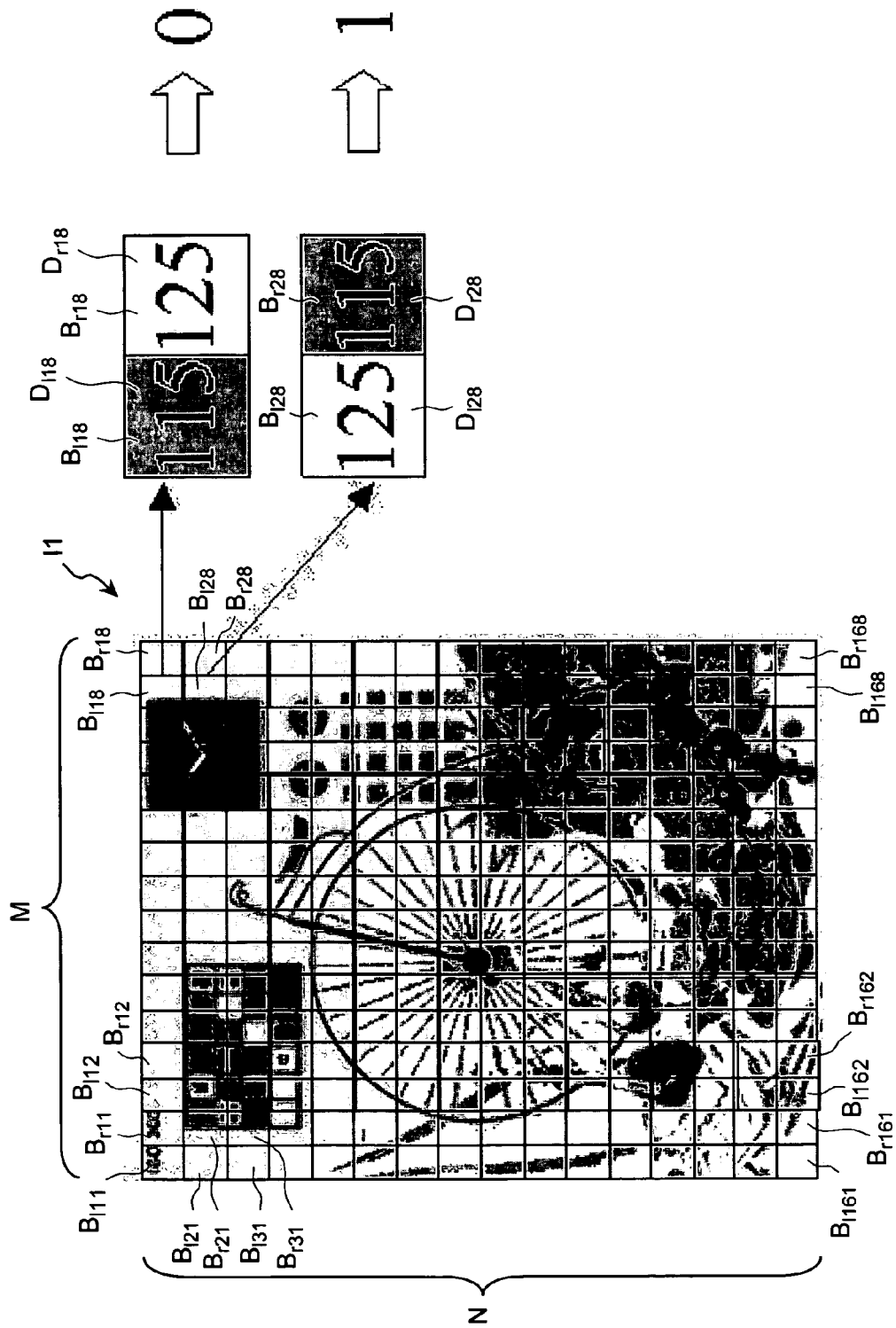

FIG.4

(A) WHEN $D_l < D_r$ $$D'_l = (D_l + D_r)/2 - T/2 \quad \cdots (1)$$
$$D'_r = (D_l + D_r)/2 + T/2 \quad \cdots (2)$$

(B) WHEN $D_l \geq D_r$ $$D'_l = (D_l + D_r)/2 + T/2 \quad \cdots (3)$$
$$D'_r = (D_l + D_r)/2 - T/2 \quad \cdots (4)$$

$D'_l$ LEFT AVERAGE DENSITY DATA AFTER MODIFICATION
$D'_r$ RIGHT AVERAGE DENSITY DATA AFTER MODIFICATION
$D_l$ LEFT AVERAGE DENSITY DATA BEFORE MODIFICATION
$D_r$ RIGHT AVERAGE DENSITY DATA BEFORE MODIFICATION
T DIFFERENCE MAINTAINED FOR EACH BLOCK

FIG.5

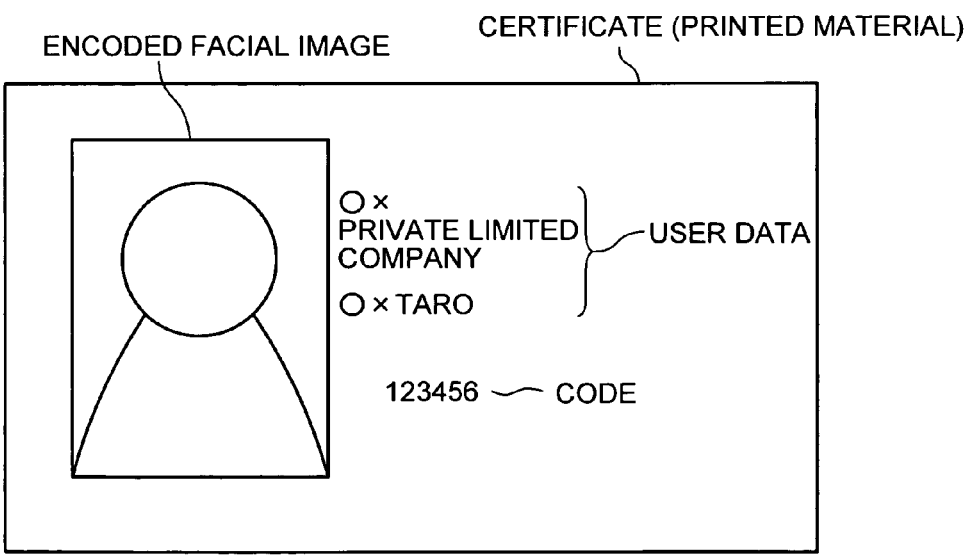

ENCODED FACIAL IMAGE
CERTIFICATE (PRINTED MATERIAL)
○×
PRIVATE LIMITED COMPANY — USER DATA
○× TARO
123456 — CODE

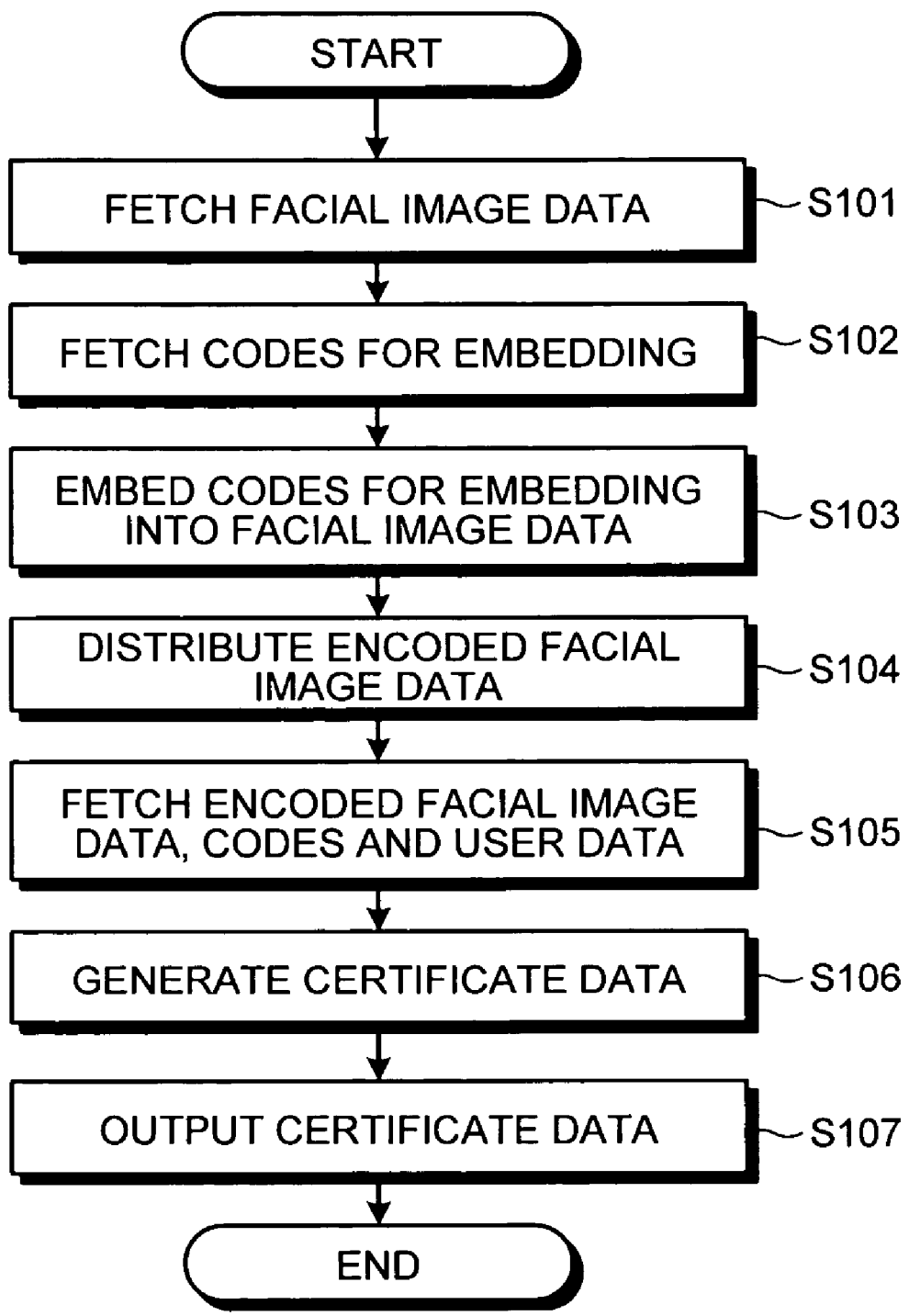

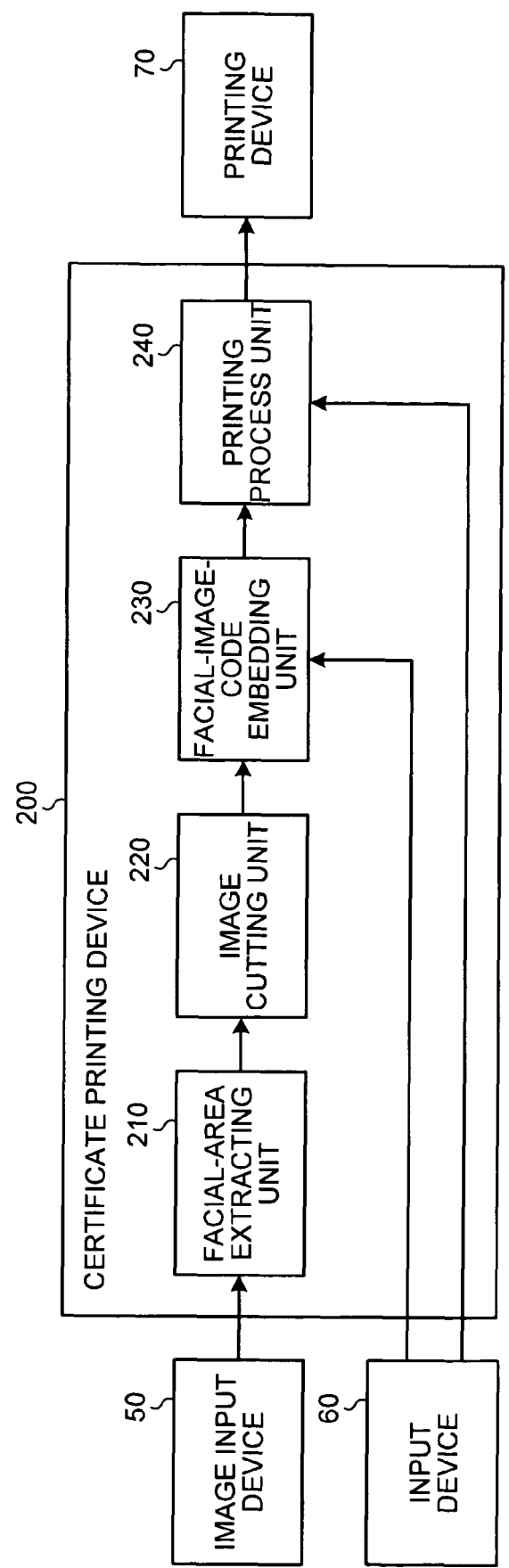

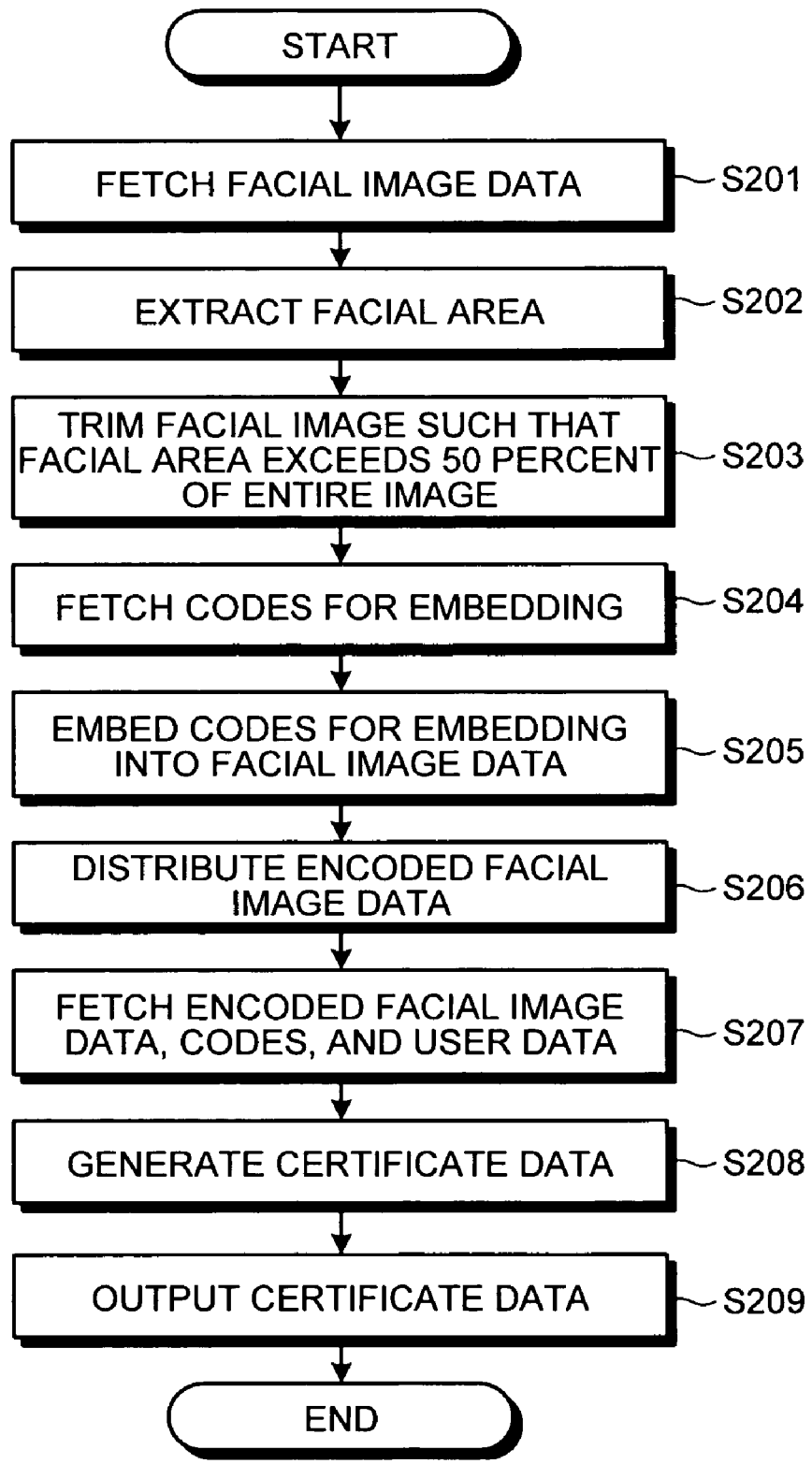

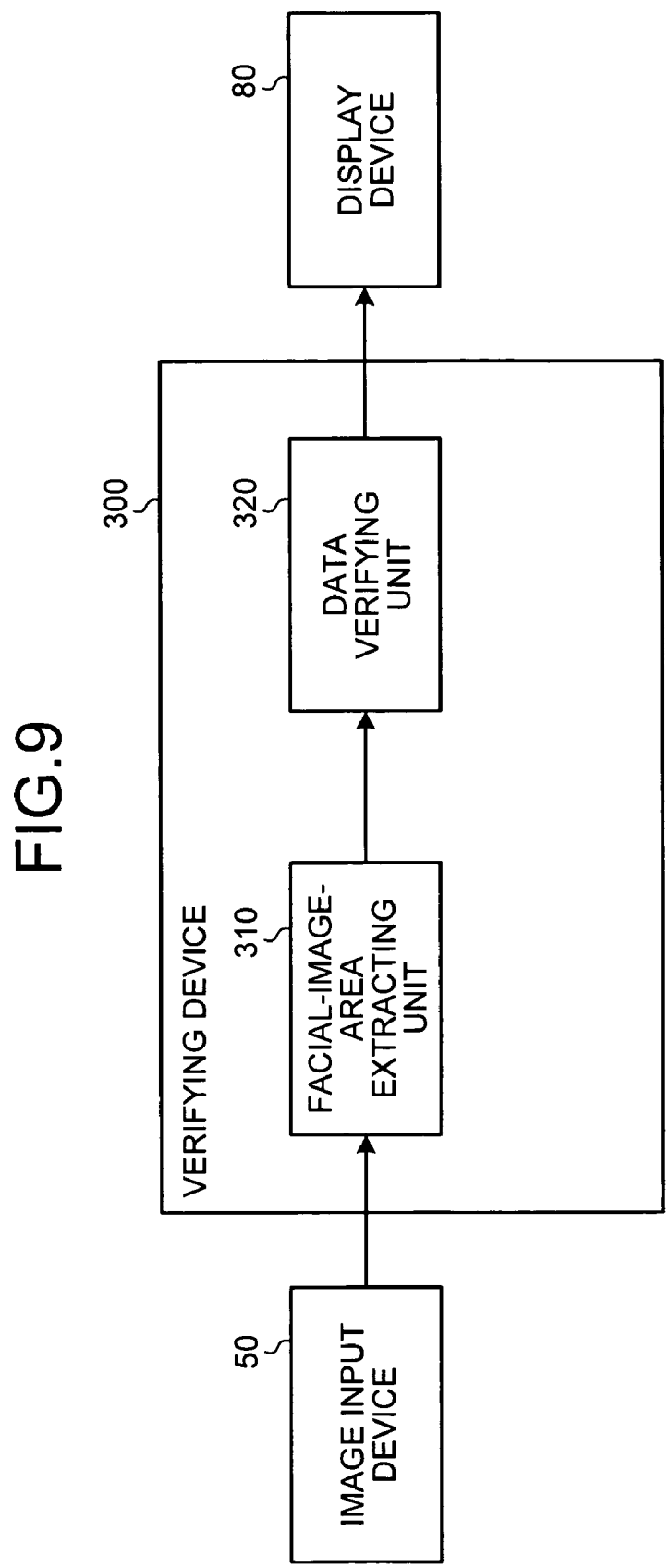

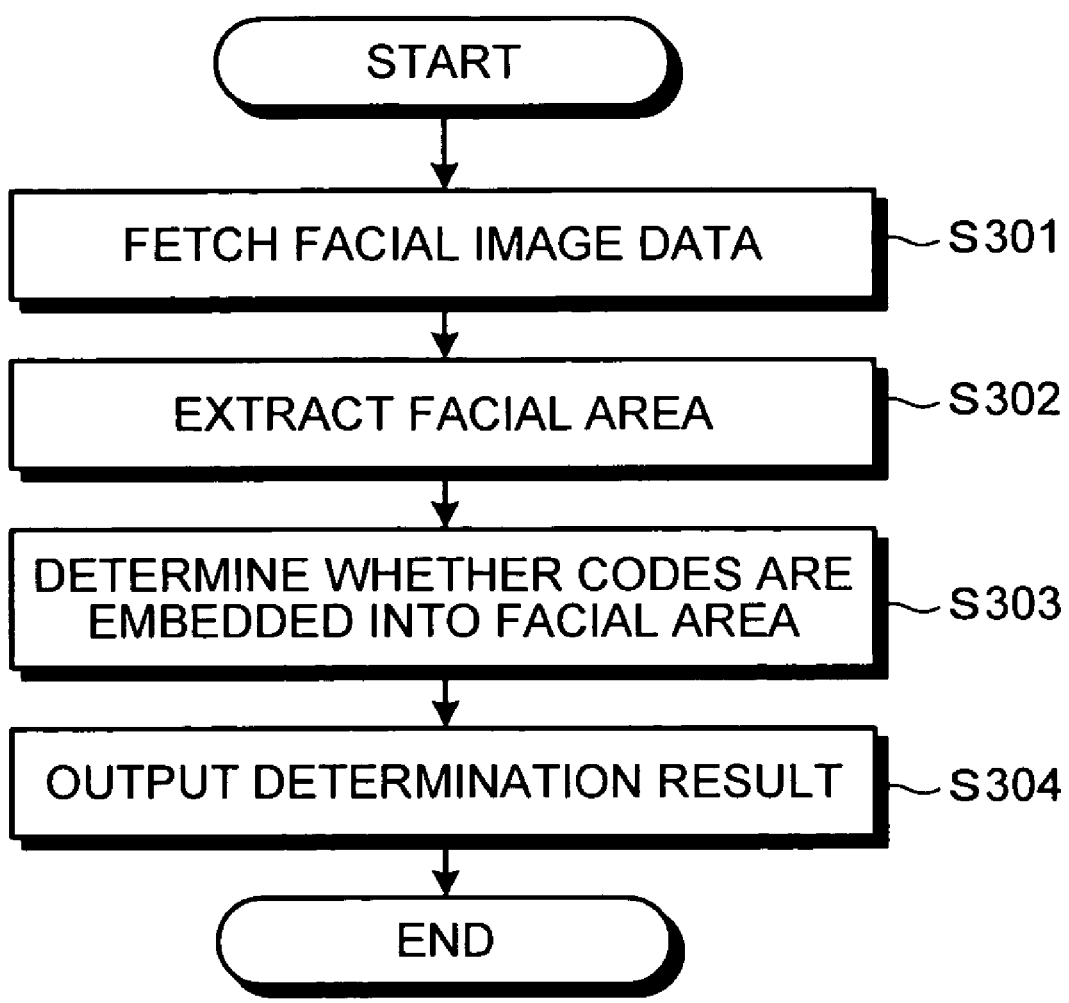

VERIFICATION DATA

| 440a |
|---|
| 123456 |
| 111112 |
| 111222 |
| 112234 |
| ⋮ |

START → FETCH FACIAL IMAGE DATA (S401) → EXTRACT FACIAL AREA (S402) → EXTRACT CODES EMBEDDED INTO FACIAL AREA (S403) → DETERMINE WHETHER EMBEDDED CODES ARE INCLUDED IN VERIFICATION DATA (S404) → OUTPUT DETERMINATION RESULT (S405) → END

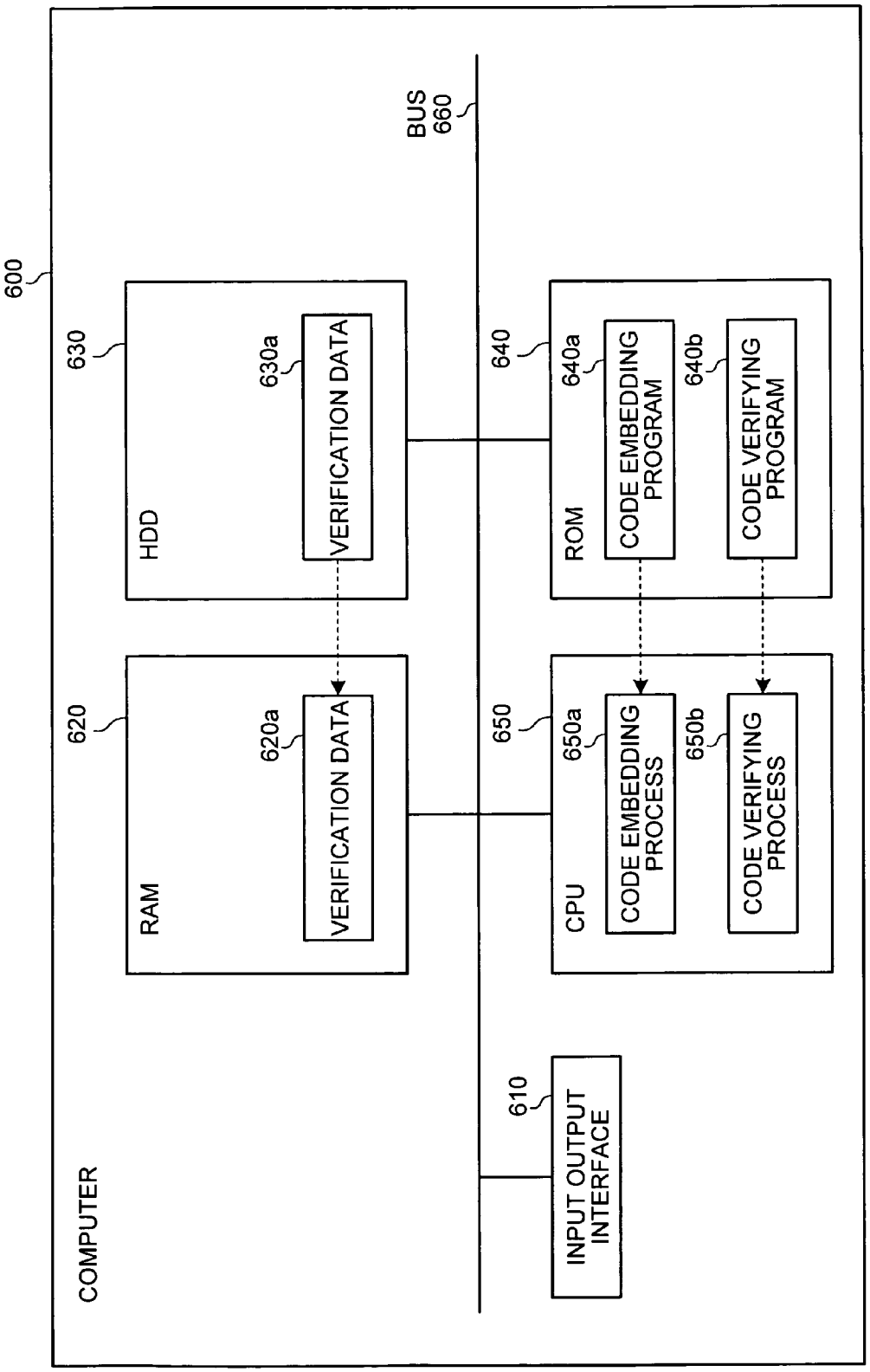

_US 7,882,347 B2_

IMAGE PRINTING DEVICE, VERIFYING DEVICE, AND PRINTED MATERIAL

BACKGROUND OF THE INVENTION

1. Field of the Invention

The present invention relates to an image printing device that prints an image, and more particularly to an image printing device, a verifying device, and printed material that enable to prevent falsification of a certificate.

2. Description of the Related Art

Various methods have been know for preventing falsification and unauthorized use of a certificate (for example, employee identification etc.). In one method, an identification code is printed on an ID card in the form of a bar code or a Quick Response (QR) code, and the identification code is also maintained at a control server. When performing verification of the ID card, the identification code printed on the ID card is read and transmitted to the control server. If the read identification code is maintained in the control server, it is determined that the ID card is authentic.

In another method, a photograph of the face of the possessor of an ID card is printed on the ID card. When a person presents an ID card, it is determined from the photograph printed on the ID card whether the person is an authentic possessor of the ID card. Integrated Circuit (IC) ID cards that carry a photograph of the face of the possessor of the card printed thereon have appeared in market. When a person presents such an IC ID-card, it is determined whether that person is an authentic possessor of the IC-ID card based on the photograph printed on the IC-ID card and data recorded in the IC ID-card.

Japanese Patent Laid-Open Publication No 2001-94755 discloses invisibly embedding security data in a background portion of a main image (a facial image of the user etc.), thereby enabling to determine whether the certificate is authentic. When embedding data, first the background portion and other portion of an original image are separated, then the security data is embedded into the background portion, and finally the security data embedded background portion and the other portion are combined to obtain an image for printing on an IC ID-card. This process prevents deterioration of the image due to embedding of the security data.

However, the conventional methods are not very reliable; because, the bar code printed on the certificate can be easily falsified or the facial photograph affixed to the certificate can be easily replaced, whether the certificate is authentic cannot be determined accurately.

When determining whether the certificate is authentic for a certificate that does not include a facial photograph specifying the user, the verifying device determines whether the certificate is authentic by using only the bar code or the QR code that is printed on the certificate. The bar code or the QR code is a standardized code and can be easily falsified by an unauthorized user.

When determining whether the certificate is authentic for the IC card certificate with a photograph, an unauthorized user can illegally get hold of the IC card certificate with the photograph and replace the photograph on the IC card certificate with his or her own photograph. Thus, the unauthorized user can easily pass off as the IC card certificate holder.

In the technology disclosed in Japanese Patent Laid-Open Publication No 2001-94755, because the security data is embedded only in the background portion of an image, the image processing device cannot determine whether a falsification such as cutting part of other portion, which is the main portion in the image, has been carried out.

There is a need of a realibale and easy technique to prevent falsification of ID cards.

SUMMARY OF THE INVENTION

It is an object of the present invention to at least partially solve the problems in the conventional technology.

According to an aspect of the present invention, an image printing device includes a splitting unit that splits an image into a plurality of blocks; a feature-quantity extracting unit that extracts a feature quantity of each of the blocks; an embedding unit that embeds data into each of the blocks based on a difference between feature quantities of that block and at least one adjacent block; and a printing unit that prints data embedded blocks to obtain a data embedded image.

According to another aspect of the present invention, a verifying device that determines whether data is embedded into an image includes an extracting unit that extracts a face portion from an image of a head of a person; and a determining unit that determines whether data is embedded into the facial portion extracted by the extracting unit.

According to still another aspect of the present invention, a printed material comprising an image printing portion for printing an image of a head of a person including a face of the person, wherein the image being divided into a plurality of blocks and data being embedded into each of the blocks based on a difference between feature quantities of that block and at least one adjacent block.

According to still another aspect of the present invention, an image printing method includes splitting an image into a plurality of blocks; extracting a feature quantity of each of the blocks; embedding data into each of the blocks based on a difference between feature quantities of that block and at least one adjacent block; and printing data embedded blocks to obtain a data embedded image.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a schematic of an example of block split image data;

FIG. 4 is an explanatory diagram for explaining a density modifying process performed by a code forming unit shown in FIG. 3;

FIG. 5 is a schematic of an example of a certificate that is printed by a printing device shown in FIG. 1;

FIG. 6 is a flowchart of a process performed by the certificate printing device shown in FIG. 1;

FIG. 7 is a block diagram of a certificate printing device according to a second embodiment of the present invention;

FIG. 8 is a flowchart of a process performed by the certificate printing device shown in FIG. 7;

FIG. 9 is a block diagram of a verifying device according to a third embodiment of the present invention;

FIG. 10 is a flowchart of a process performed by the verifying device according shown in FIG. 9;

FIG. 15 is a schematic of a computer that realizes the methods according to the above embodiments.

DETAILED DESCRIPTION OF THE PREFERRED EMBODIMENTS

Exemplary embodiments of the present invention are explained next with reference to the accompanying drawings.

First, a salient feature of the present invention is explained by comparing the present invention with the conventional technology.

When codes are embedded into an image by using the conventional techniques, the code causes severe deterioration of the image.

Therefore, in the conventional technology, codes were embedded only into the background portion of the image and codes were not embedded in the facial area so that the facial area does not deteriorate. However, in this case, because no codes were embedded in the facial area of the image, it is possible to falsify an ID card by pasting another facial area on the original facial area. The present invention presents a technique that prevents image deterioration even when codes are embedded into the image. This technique uses a difference between average densities of the image to embed codes into the image, and codes for verifying the user are embedded into the entire image including the facial area. As a result, it becomes impossible to falsify the ID card.

Figure 1:
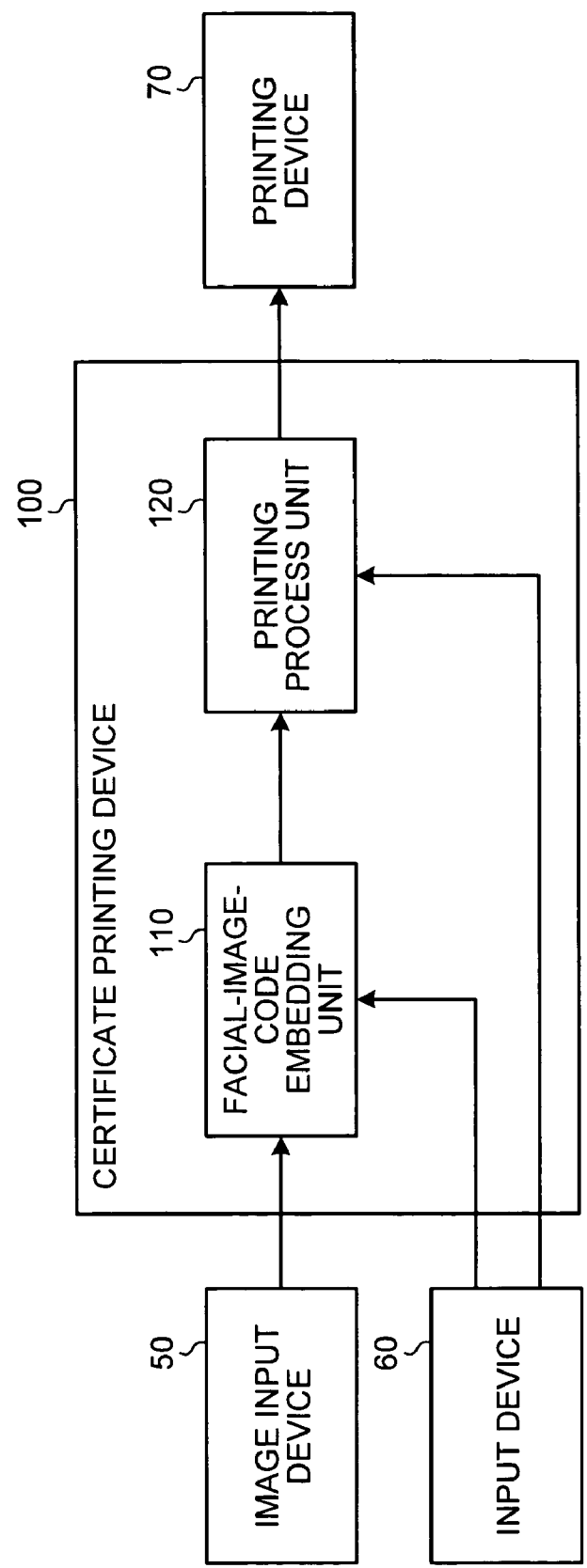
FIG. 1 is a block diagram of a certificate printing device according to a first embodiment of the present invention.

A structure of a certificate printing device according to a first embodiment is explained next. In the first embodiment, the certificate printing device is implimented by using an image printing device. FIG. 1 is a block diagram of a certificate printing device 100 according to the first embodiment. The certificate printing device 100 includes a facial-image-code embedding unit 110 and a printing process unit 120. The certificate printing device 100 is connected to an image input device 50, an input device 60, and a printing device 70.

The image input device 50 scans the image that is traced (printed) on a paper or a film to fetch image data and inputs the fetched image data into the certificate printing device 100. The image input device 50 according to the first embodiment mainly fetches facial image data for using in the certificate (the facial image data includes not only an image of the user's facial area, but also an image of the neck and the torso of the user, a background etc.) from a photograph for the certificate etc., and inputs the fetched facial image data into the certificate printing device 100.

The input device 60 is an input device such as a keyboard. A controller of the certificate printing device 100 uses the input device 60 to input codes that are embedded into the facial image data and user data that is printed in the certificate (name of the user corresponding to the facial image data, designation of the user etc.). The printing device 70 prints image data that is output from the certificate printing device 100.

Returning to the certificate printing device 100, the facial-image-code embedding unit 110 embeds codes fetched from the input device 60 in the facial image data fetched from the image input device 50. The facial-image-code embedding unit 110 embeds a 16-bit code eight times into the facial image data to generate facial image data having encoded codes. The facial image data is image data generated in a predetermined format such as Joint Photographic Expert Group (JPEG), Graphic Interchange Format (GIF) etc. and has a size of 1024 by 1024 pixels. A 16-bit code such as 1010110101001010 is embedded into the facial image data.

Figure 2:
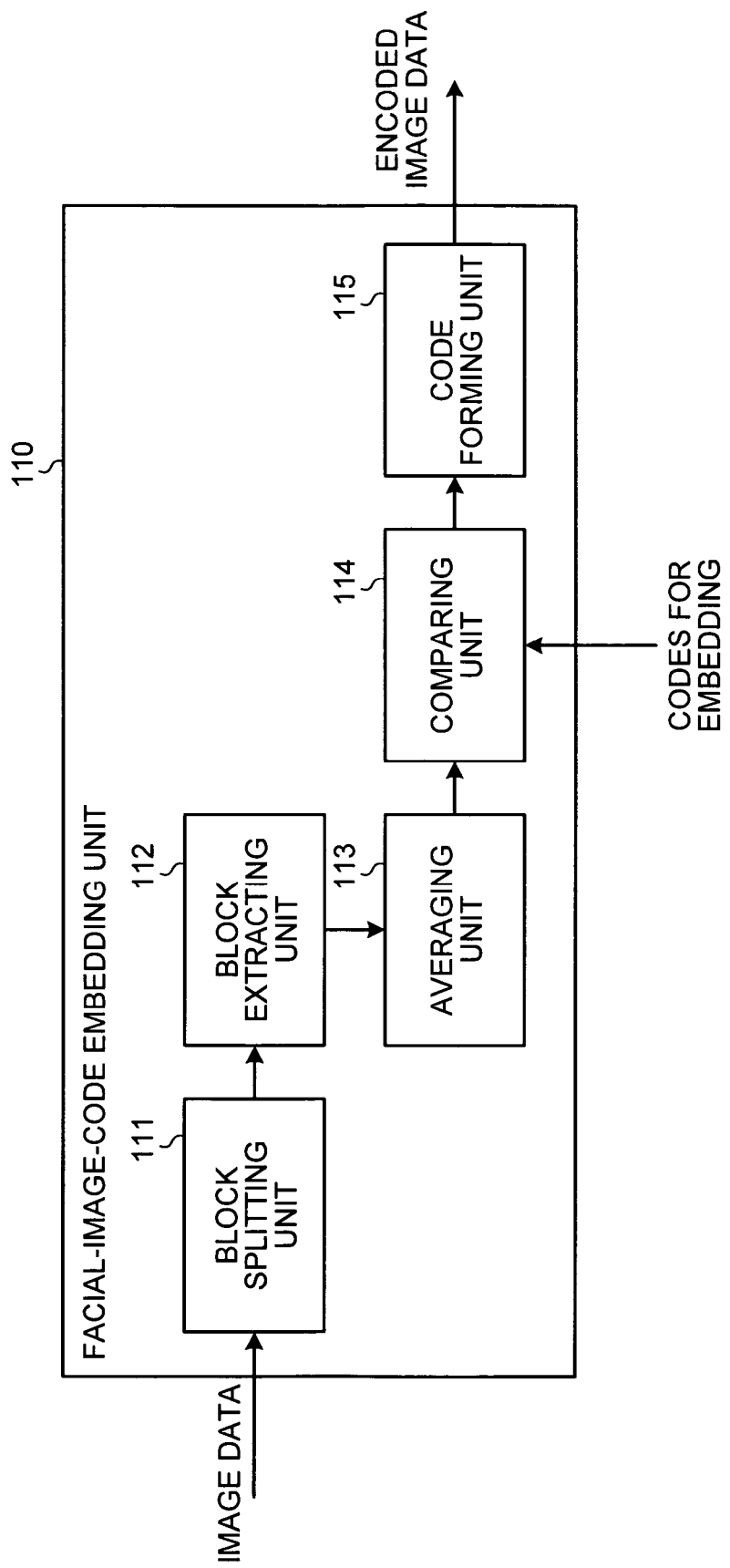
FIG. 2 is a block diagram of a structure of a facial-image-code embedding unit shown in FIG. 1.

A structure of the facial-image-code embedding unit 110 is explained in detail next. FIG. 2 is a detailed block diagram of the facial-image-code embedding unit 110. The facial-image-code embedding unit 110 includes a block splitting unit 111, a block extracting unit 112, an averaging unit 113, a comparing unit 114, and a code forming unit 115.

The block splitting unit 111 inputs the facial image data, splits the facial image data into blocks of N lines and M rows (In the first embodiment, N=16 and M=16), and outputs the facial image data as block split image data I1. FIG. 3 is a schematic of an example of the block split image data I1. As shown in FIG. 3, for the sake of convenience, the example of the block split image data is indicated by using an image other than a facial image (the facial image data is similarly split as the block split image data shown in FIG. 3 by the block splitting unit 110).

As shown in FIG. 3, the block split image data I1 includes 256 blocks (16 lines and 16 rows) such as blocks $B_{l11}$, $B_{r11}$, ..., $B_{l18}$, $B_{r18}$, $B_{l21}$, $B_{r21}$, ..., $B_{l168}$, $B_{r168}$ and so on. A single block has a size of 64 by 64 pixels. In the block split image data I1, 1-bit code is embedded into a pair block (two adjacent blocks).

To be specific, the pair blocks are formed of two blocks such as blocks $B_{l11}$ and $B_{r11}$, blocks $B_{l12}$ and $B_{r12}$, ..., blocks $B_{l18}$ and $B_{r18}$ (forming the first line), blocks $B_{l21}$, and $B_{r21}$, ..., blocks $B_{l28}$ and $B_{r28}$ (forming the second line), ..., blocks $B_{l161}$, and $B_{r161}$, ..., blocks $B_{l168}$ and $B_{r168}$ (forming the sixteenth line).

In a block $B_{lxy}$ of a pair block, a subscript l indicates that the block $B_{lxy}$ is a left block, a subscript x indicates a line (N), and a subscript y indicates a row (M). Similarly, in a block $B_{rxy}$ of the pair block, a subscript r indicates that the block $B_{rxy}$ is a right block, a subscript x indicates a line (N), and a subscript y indicates a row (M).

Further, in a pair block, a feature quantity in the form of an average density level (average grayscale of each pixel in the block is between 0 and 255) of the left block $B_{lxy}$ is indicated by a left average density data $D_l$. An average density level (feature quantity) of the right block $B_{rxy}$ is indicated by a right average density data $D_r$.

As shown in the following relational expression, if the left average density data $D_l$ is less than the right average density data $D_r$, 1-bit code of the pair block is represented as 0. If the left average density data $D_l$ is greater than the right average density data $D_r$, 1-bit code of the pair block is represented as 1.

$$D_{l<Dr} \rightarrow 0$$

$$D_{l \geq Dr} \rightarrow 0$$

For example, as shown in FIG. 3, in a pair block consisting of blocks $B_{l18}$ and $B_{r18}$, because a left average density data $B_{l18}$ is 115 and a right average density data $B_{r18}$ is 125, 1-bit code of the pair block is represented by 0.

Similarly, in a pair block consisting of blocks $B_{l28}$ and $B_{r28}$, because a left average density data $B_{l28}$ is 125 and a right average density data $B_{r28}$ is 115, 1-bit code of the pair block is represented by 1.

In the block split image data I1, because a single line includes eight pair blocks (16 blocks), one line is represented by an 8-bit code. Thus, all the lines (16 lines) in the block split image data I1 are represented by 128-bit codes. In the first embodiment, because codes C, which are embedded into the block split image data I1 include 16 bits, the codes C can be embedded into the block split image data I1 a maximum eight times (128 divided by 16).

Returning to FIG. 2, the block extracting unit 112 sequentially extracts pair blocks (block $B_{lxy}$ and block $B_{rxy}$) according to bit shift of the codes C, and sequentially outputs density distributions of the block $B_{lxy}$ and the block $B_{rxy}$ as block density data D.

Bit shift of the codes C indicates bit by bit shifting of bit pointers of the codes C from a bit at the extreme left (1) towards a bit at the extreme right (0) of the codes C.

The averaging unit 113 computes the left average density data $D_l$ corresponding to the block $B_{lxy}$ and the right average density data $D_r$ corresponding to the block $B_{rxy}$ from the block density data D.

The comparing unit 114 compares n-th bit of the codes C (such that n=1, 2, ..., 16 beginning from the bit at the extreme left) with a bit determination result that is determined from a magnitude relation between the left average density data $D_l$ and the right average density data $D_r$ (based on the aforementioned relational expression, bit is determined as 0 or 1).

Based on the comparison result of the comparing unit 114, the code forming unit 115 embeds the codes C into the block split image data I1 (the facial image data). To be specific, if the comparison result of the comparing unit 114 is matching, the code forming unit 115 maintains the magnitude relation between the left average density data $D_l$ and the right average density data $D_r$. If the comparison result of the comparing unit 114 is not matching, the code forming unit 115 carries out a density modifying process to modify (reverse the magnitude relation) the left average density data $D_l$ and the right average density data $D_r$ such that the magnitude relation between the left average density data $D_l$ and the right average density data $D_r$ represents bits of the codes C, generates facial image data having the encoded codes (hereinafter, "encoded facial image data"), and outputs the encoded facial image data.

FIG. 4 is a schematic for explaining the density modifying process performed by the code forming unit 115. In the density modifying process, if $D_l$ is less than $D_r$, a left average density data $D'_l$ after modification is computed by using the expression (1) (see FIG. 4), and a right average density data $D'_r$ after modification is computed by using the expression (2). T indicates a level difference between the pair block, and has a value such as 30. Due to this, after density modification, the left average density data $D'_l$ becomes less than the right average density data $D'_r$, and the bit determination result is changed from 1 to 0.

If $D_l$ is greater than or equal to $D_r$, a left average density data $D'_l$ after modification is computed by using the expression (3), and a right average density data $D'_r$ after modification is computed by using the expression (4). Due to this, after density modification, the left average density data $D'_l$ becomes greater than the right average density data $D'_r$, and the bit determination result is changed from 0 to 1.

Generally, facial image includes a large amount of yellow color component. Thus, embedding the aforementioned codes into the facial image data by using the yellow color component enables to carry out data embedding such that deterioration of the image is less noticeable. An example of code embedding using the yellow color component is explained next.

The facial image data includes data pertaining to colors in a Red Green Blue (RGB) format. According to a relation pertaining to complementary colors, the yellow color component is represented by B from the RBG format. Thus, when extracting the split block density data D, the block extracting unit 112 takes average grayscale pertaining to B as the block density data D, and the averaging unit 113 computes the right average density data and the left average density data from the block density data D (average density data pertaining to B is represented by B average density data). The comparing unit 114 compares B average density data pertaining to an adjacent block pair.

If the magnitude relation pertaining to B average density data of the block pair is matching with the code for embedding, for example, if right B average density data is greater than left B average density data when embedding the code 0 into the block pair, the code forming unit 115 maintains the magnitude relation between the right B average density data and the left B average density data.

If the magnitude relation pertaining to B average density data of the block pair is not matching with the code for embedding, for example, if the right B average density data is less than the left B average density data when embedding the code 0 into the block pair, the code forming unit 115 reverses the magnitude relation between the right B average density data and the left B average density data.

Returning to FIG. 1, the printing process unit 120 fetches the encoded facial image data from the facial-image-code embedding unit 110, fetches codes and the user data from the input device 60, and based on the fetched data generates certificate data. The certificate data includes the encoded facial image data, codes, and the user data. The printing process unit 120 inputs the generated certificate data into the printing device 70 and causes the printing device 70 to print the certificate. FIG. 5 is a schematic of an example of a certificate printed by the printing device 70.

A process performed by the certificate printing device 100 according to the first embodiment is explained next. FIG. 6 is a flowchart of the process performed by the certificate printing device 100. The facial-image-code embedding unit 110 of the certificate printing device 100 fetches the facial image data from the image input device 50 (step S101) and fetches the codes for embedding from the input device 60 (step S102).

Next, the facial-image-code embedding unit 110 embeds the codes for embedding into the facial image data (step S103), and distributes the encoded facial image data to the printing process unit 120 (step S104). The printing process unit 120 fetches the encoded facial image data, codes and the user data (step S105).

The printing process unit 120 generates the certificate data from the encoded facial image data, the codes, and the user data (step S106), outputs the certificate data to the printing device 70, and causes the printing device 70 to print the certificate (step S107).

Thus, the facial-image-code embedding unit 110 embeds the codes for embedding into the facial image data that includes the facial area, based on the facial image data that includes the embedded codes, the printing process unit 120 generates the certificate data, and causes the printing device 70 to print the certificate, thereby enabling to prevent falsification pertaining to the certificate.

Thus, in the certificate printing device 100, the facial-image-code embedding unit 110 embeds codes into the facial image data fetched from the image input device 50 using a difference between the average densities of the facial image data to generate the encoded facial image data, thereby enabling to prevent image deterioration due to embedding of codes into an image. The printing process unit 120 uses the encoded facial image data to generate the certificate data, outputs the generated certificate data to the printing device 70, and causes the printing device 70 to print the certificate, thereby enabling to prevent falsification of certificates.

A salient feature of a certificate printing device according to a second embodiment is explained next. The certificate printing device according to the second embodiment extracts the user's facial area that is included in the facial image, trims the facial image such that the facial area represents more than a predetermined percentage (greater than 50 percent) of the entire image, and embeds codes into the trimmed facial image. Next, the certificate printing device prints the facial image having the embedded codes as the certificate.

Thus, the certificate printing device according to the second embodiment trims the facial image such that the user's facial area represents more than the predetermined percentage of the facial image, embeds codes into the trimmed facial image, and uses the facial image as the certificate, thereby enabling to prevent falsification pertaining to the certificate and enabling to accurately determine whether the certificate is authentic.

A structure of the certificate printing device according to the second embodiment is explained next. FIG. 7 is a schematic of the structure of a certificate printing device 200 according to the second embodiment. The certificate printing device 200 includes a facial area extracting unit 210, an image cutting unit 220, a facial-image-code embedding unit 230, and a printing process unit 240. The certificate printing device 200 is connected to the image input device 50, the input device 60, and the printing device 70. Because the image input device 50, the input device 60, and the printing device 70 are similar to the image input device 50, the input device 60, and the printing device 70 that are shown in FIG. 1 respectively, the explanation is omitted.

The facial area extracting unit 210 fetches the facial image data from the image input device 50, and extracts the user's facial area that is included in the fetched facial image data. A facial part detecting method disclosed in Japanese Patent Specification No 2000-132688 can be used, for example, as a method to extract the facial area. In the facial part detecting method, existence probability pertaining to facial parts in various pixel locations of the input image is computed from the input image by using template matching and probability distribution pertaining to the prior learnt facial parts is computed from sample data. Points where the existence probability and the probability distribution increase together are detected as the facial parts. The facial area extracting unit 210 distributes data pertaining to the extracted facial area (hereinafter, "facial area data") and the facial image data to the image cutting unit 220.

The image cutting unit 220 fetches the facial image data and the facial area data from the facial area extracting unit 210 and cuts the facial image such that the facial area represents more than 50 percent of the facial image. The image cutting unit 220 distributes data pertaining to the cut facial image to the facial-image-code embedding unit 230.

Because the facial-image-code embedding unit 230 and the printing process unit 240 are similar to the facial-image-code embedding unit 110 and the printing process unit 120 shown in FIG. 1 respectively, the explanation is omitted.

A process performed by the certificate printing device 200 is explained next. FIG. 8 is a flowchart of the process performed by the certificate printing device 200. As shown in FIG. 8, the image area extracting unit 210 of the certificate printing device 200 fetches the facial image data from the image input device 50 (step S201) and extracts the facial area (step S202).

The image cutting unit 220 fetches the facial image data and the facial area data from the facial area extracting unit 210, trims the facial image such that the facial area represents more than 50 percent of the entire facial image, and distributes the trimmed facial image data to the facial-image-code embedding unit 230 (step S203).

The facial-image-code embedding unit 230 fetches the codes for embedding from the input device 60 (step S204), embeds the codes for embedding into the facial image data (step S205), and distributes the encoded facial image data to the printing process unit 240 (step S206).

The printing process unit 240 fetches the encoded facial image data, the codes and the user data (step S207), generates the certificate data from the fetched data (step S208), outputs the generated certificate data to the printing device 70 and causes the printing device 70 to print the certificate (step S209).

Thus, the facial area extracting unit 210 extracts the facial area, the image cutting unit 220 trims the facial image such that the facial area represents more than 50 percent of the entire facial image, and the facial-image-code embedding unit 230 embeds the codes for embedding into the trimmed facial image data, thereby enabling to prevent image deterioration and to generate printed material that enables to determine whether the printed material is authentic.

Thus, in the certificate printing device 200, the facial area extracting unit 210 extracts the facial area from the facial image data, the image cutting unit 220 trims the facial image such that the facial area represents more than 50 percent of the entire facial image, the facial-image-code embedding unit 230 embeds the codes into the trimmed facial image data by using a difference between average densities to generate the encoded facial image data, the printing process unit 240 uses the encoded facial image data to generate the certificate data, outputs the generated certificate data to the printing device 70, and causes the printing device 70 to print he certificate, thereby enabling to prevent image deterioration and prevent falsification by replacement of the facial portion.

A salient feature of a verifying device according to a third embodiment of the present invention is explained next. The verifying device according to the third embodiment extracts the user's facial area included in the facial image and determines whether the extracted facial area includes data (codes). Thus, extracting the facial area from the facial image and determining whether the extracted facial area includes data enables to accurately determine whether the certificate is authentic.

A structure of the verifying device according to the third embodiment is explained next. FIG. 9 is a block diagram of the structure of a verifying device 300 according to the third embodiment. The verifying device 300 includes a facial image area extracting unit 310 and a data verifying unit 320. The verifying device 300 is connected to the image input deice 50 and a display device 80. Because the image input device 50 is similar to the image input device 50 shown in FIG. 1, the explanation is omitted. The display device 80 is a display device such as a display.

The facial image area extracting unit 310 fetches the facial image data from the image input device 50 and extracts the user's facial area from the fetched facial image data. A method similar to the method that is used by the facial area extracting unit 210 in the second embodiment can be used to extract the facial area. The facial image area extracting unit 310 distributes the extracted facial area data and the facial image data to the data verifying unit 320.

The data verifying unit 320 fetches the facial image data and the facial area data from the facial image area extracting unit 310 and determines whether codes are embedded into the facial area of the facial image. In other words, the data verifying unit 320 splits the facial image into multiple blocks and based on the average density difference between the adjacent blocks extracts the codes that are embedded into the facial area.

If codes are embedded into the facial area of the facial image, the data verifying unit 320 outputs in the display device 80 a notification stating that codes are embedded into the facial area. If codes are not embedded into the facial area of the facial image, the data verifying unit 320 outputs in the display device 80 a notification stating that codes are not embedded into the facial area.

A specific process that is used by the data verifying unit 320 to determine whether codes are embedded into the facial area of the facial image is explained next. If the facial image that is input into the image input device 50 is officially encoded by the certificate printing device 100 and the certificate printing device 200 that are explained in the first and the second embodiments respectively, codes and error correcting values pertaining to the codes are repeatedly embedded as sets into the facial area of the facial image. Although not explained in the first and the second embodiments, during encoding, the certificate printing devices 100 and 200 repeatedly embed the codes and the error correcting values as sets into the facial area. The data verifying unit 320 fetches multiple codes and the error correcting values that are embedded into the facial area and corrects each code by using the corresponding error correcting value.

Next, the data verifying unit 320 carries out a majority selection using the corrected multiple codes to determine the codes. For example, if the corrected codes are 101, 101, and 111, based on a result of the majority selection, 101 is determined as the code embedded into the facial area. If the data verifying unit 320 is able to determine the codes from the facial area, the data verifying unit 320 determines that the certificate input from the image input device 50 is not falsified.

If the facial image input into the image input device 50 is falsified (not officially encoded), codes and the error correcting values are not embedded as sets into the facial area, and the data verifying unit 320 cannot determine the codes from the facial area by using the aforementioned method (even if numerical values from the falsified facial image are read using the average density difference, the numerical values are random and the data verifying unit 320 cannot determine the codes by using the aforementioned majority selection). Thus, the data verifying unit 320 determines that the certificate input from the image input device 50 is falsified.

A process performed by the verifying device 300 is explained next. FIG. 10 is a flowchart of the process performed by the verifying device 300. As shown in FIG. 10, the facial image area extracting unit 310 of the verifying device 300 fetches the facial image data from the image input device 50 (step S301) and extracts the facial area (step S302).

The data verifying unit 320 determines whether codes are embedded into the facial area (step S303) and outputs a determination result in the display device 80 (step S304).

Thus, the facial image area extracting unit 310 extracts the user's facial area included in the facial image, and the data verifying unit 320 determines whether data is embedded into the facial area, thereby enabling to accurately determine whether the certificate is authentic.

Thus, in the verifying device 300, the facial image area extracting unit 310 fetches the facial image data from the image input device 50 and extracts the facial area. The data verifying unit 320 determines whether codes are embedded into the facial area, and outputs the determination result in the display device 80, thereby enabling to accurately determine whether the-certificate is authentic.

Figure 11:
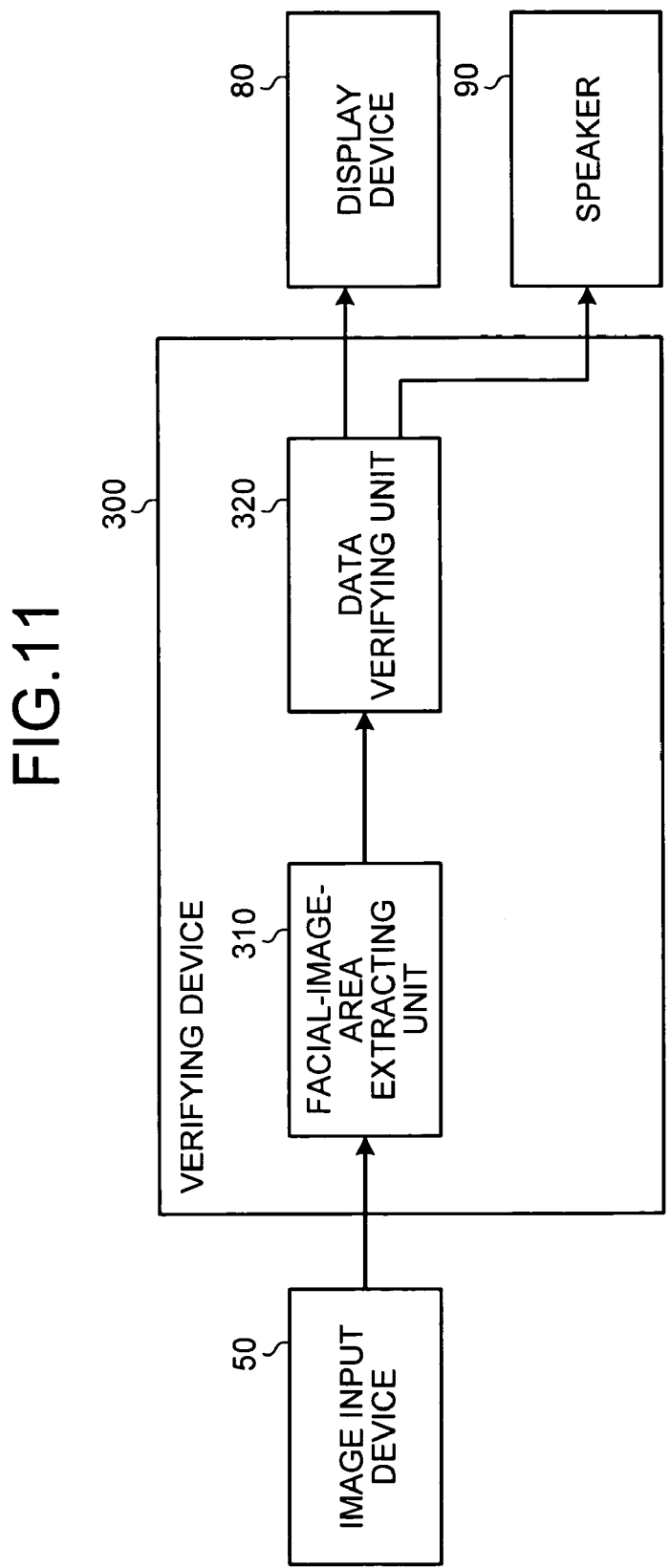
FIG. 11 is a block diagram of a verifying device according to a variation of the third embodiment.

It has, been explained above that the verifying device 300 displays the determination result using the display device. However, the determination result can be notified to the controller etc. using sound. FIG. 11 is a block diagram of a variation of the verifying device 300 that includes a speaker.

As shown in FIG. 11, the data verifying unit 320 outputs the determination result in the display device 80 and also notifies the determination result to the controller using the speaker. For example, if codes are embedded into the facial area, the data verifying unit 320 causes a speaker 90 to output a sound, and if codes are not embedded into the facial area, the speaker 90 does not output a sound.

Thus, notifying the determination result to the controller by a sound from the speaker 90 greatly reduces a burden on the controller to check whether the certificate is authentic.

A salient feature of a verifying device according to a fourth embodiment of the present invention is explained next. The verifying device according to the fourth embodiment extracts the user's facial area included in the facial image and reads the codes embedded into the extracted facial image. Next, the verifying device determines whether the read codes are matching with codes that are stored beforehand in a storage unit, thereby determining whether the certificate is valid.

Thus, the verifying device according to the fourth embodiment reads codes from the facial area and determines whether the read codes are matching with the codes that are stored beforehand in the storage unit. Modifying the codes that are stored in the storage unit enables the controller to prevent falsification of the image pertaining to the certificate and also enables to easily invalidate the certificate of a retired employee.

Figure 12:
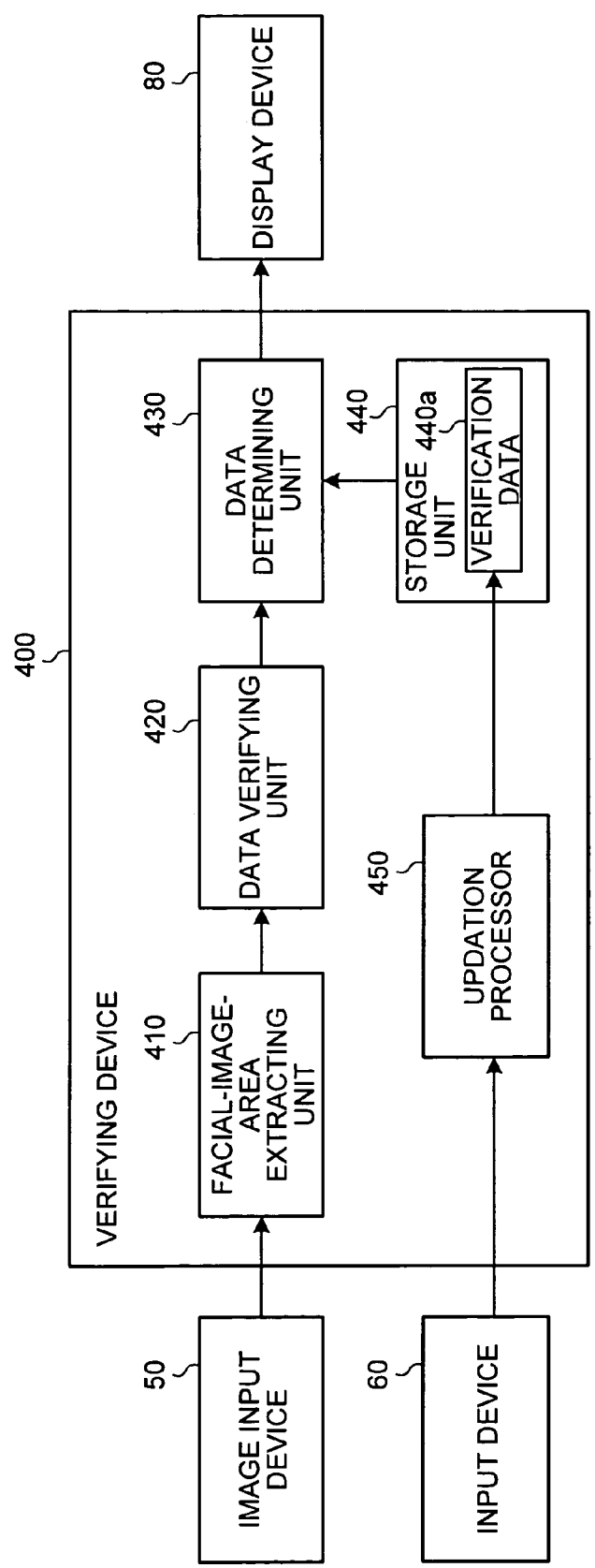
FIG. 12 is a block diagram of a verifying device according to a fourth embodiment of the present invention.

A structure of the verifying device according to the fourth embodiment is explained next. FIG. 12 is a block diagram of the structure of a verifying device 400 according to the fourth embodiment. The verifying device 400 includes a facial image area extracting unit 410, a data verifying unit 420, a data determining unit 430, a storage unit 440, and an updation processor 450. The verifying device 400 is connected to the image input device 50, the input device 60, and the display device 80.

Because the image input device 50 and the display device 80 are similar to the image input device 50 and the display device 80 that are shown in FIG. 9 respectively, the explanation is omitted. The input device 60 is an input device such as a keyboard etc. In the fourth embodiment, the controller uses the input device 60 to input verification data that verifies data embedded into the facial image. The controller of the verifying device 400 gets data pertaining to the codes that are embedded into the facial image data from the controller of the certificate printing devices 100 and 200 that are explained in the first and the second embodiments respectively, and inputs the verification data into the input device 60.

Similarly as the facial image area extracting unit 310, the facial image area extracting unit 410 fetches the facial image data from the image input device 50, and extracts the user's facial area from the fetched facial image data. The facial image area extracting unit 410 distributes the extracted facial area data and the facial image data to the data verifying unit 420.

The data verifying unit 420 fetches the facial image data and the facial area data from the facial image area extracting unit 410 and extracts the codes embedded into the facial area of the facial image. The data verifying unit 420 splits the facial image into multiple blocks and based on the average density difference pertaining to the adjacent blocks extracts the codes that are embedded into the facial area. The data verifying unit 420 distributes the extracted codes to the data determining unit 430.

Figure 13:
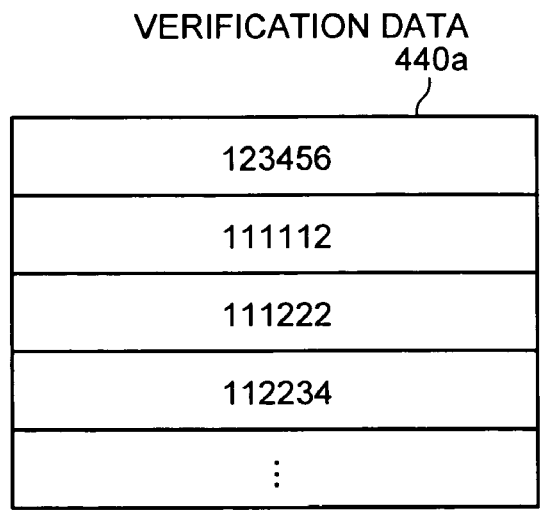
FIG. 13 is an example of the data structure of verification data.

The data determining unit 430 fetches the codes from the data verifying unit 420, determines whether the fetched codes are included in verification data 440a that is stored in the storage unit 440, and outputs the determination result in the display device 80. The verification data 440a is data for verifying the codes that are embedded into the facial image data. FIG. 13 is a schematic of an example of a data structure of the verification data. The certificate is valid if the codes included in the verification data 440a are embedded into the facial image area.

If the codes included in the verification data 440a are extracted from the facial area of the facial image, the data determining unit 430 determines that the certificate having the affixed facial image is valid. If the codes included in the verification data 440a are not extracted from the facial area of the facial image, the data determining unit 430 determines that the certificate having the affixed facial image is invalid.

Upon fetching verification data from the input device 60, the updation processor 450 uses the fetched verification data to update the verification data 440a stored in the storage unit 440. To prevent unauthorized updation of the verification data 440a, the updation processor 450 can fetch a password from the input device 60 and update the verification data if the fetched password is accurate.

In the fourth embodiment, the verifying device 400 fetches verification data from the input device 60 and the updation processor 450 updates the verification data 440a stored in the storage unit 440. However, the verifying device 400 can also fetch verification data via a network from a control server etc. that controls the verification data and update the verification data 440a stored in the storage unit 440.

Figure 14:
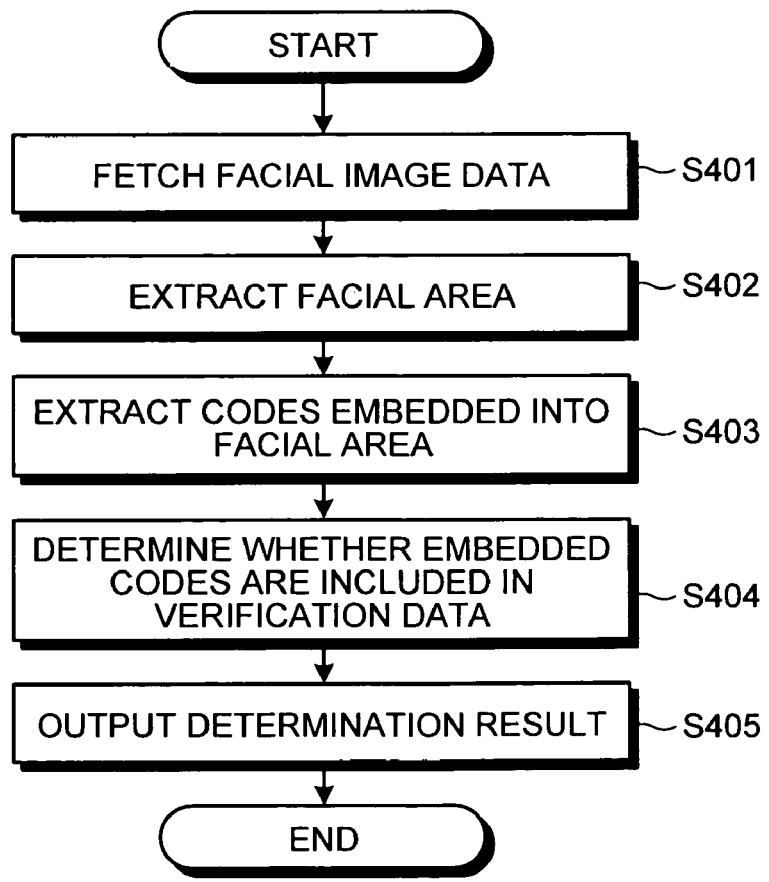
FIG. 14 is a flowchart of a process performed by the verifying device shown in FIG. 12.

A process performed by the verifying device 400 is explained next. FIG. 14 is a flowchart of the process performed by the verifying device 400. As shown in FIG. 14, the facial image area extracting unit 410 of the verifying deice 400 fetches the facial image data from the image input device 50 (step S401) and extracts the facial area (step S402).

The data verifying unit 420 extracts the codes embedded into the facial area (step S403). The data determining unit 430 determines whether the codes embedded into the facial area are included in the verification data 440a (step S404) and outputs the determination result in the display device 80 (step S405).

Thus, the facial image area extracting unit 410 extracts the facial area, the data verifying unit 420 extracts the codes embedded into the facial area, and the data determining unit 430 determines whether the codes embedded into the facial area are included in the verification data 440a, thereby enabling to accurately determine whether the certificate is authentic and also enabling to determine whether the certificate is valid.

Thus, in the verifying device 400, the facial image area extracting unit 410 fetches the facial image data from the image input device 50 and extracts the facial area. The data verifying unit 420 extracts the codes embedded into the facial area, and data determining unit 430 determines whether the codes embedded into the facial area are included in the verification data 440a, thereby enabling to prevent falsification of the certificate and also enabling to easily modify the validity of the certificate.

A certificate printing device and a verifying device that use average density are explained in the first through the fourth embodiments. However, the present invention is not to be thus limited, and can be similarly applied to a certificate printing device and a verifying device that use other feature quantities related to image such as amount of granulation, color saturation, density equilibrium, dispersion etc.

The certificate printing device and the verifying device that use the average density difference between the pair blocks are explained in the first through the fourth embodiments. However, the present invention is not to be thus limited, and can be similarly applied to a certificate printing device and a verifying device that use the average density difference of other combinations of blocks.

Each process performed by the certificate printing device or the verifying device can be realized by causing a computer to execute a program related to a code embedding process or a code verifying process. An example of the computer which executes a code embedding program and a code verifying program that include functions similar to the certificate printing device and the verifying device explained in the aforementioned embodiments is explained with reference to FIG. 15. FIG. 15 is a schematic of the computer that executes the code embedding program and the code verifying program.

As shown in FIG. 15, a computer 600 includes an input output interface 610, a Random Access Memory (RAM) 620, a Hard Disk Drive (HDD) 630, a Read Only Memory (ROM) 640, and a Central Processing Unit (CPU) 650 that are connected by buses 660. The input output interface 610 is an interface for connecting an input device such as a keyboard, an image input device and a display device such as a scanner, and an output device such as a printer, a speaker etc.

If the computer 600 is the certificate printing device, the ROM 640 stores the code embedding program that includes functions similar to the certificate printing devices 100 and 200 explained in the embodiments. In other words, as shown in FIG. 15, the ROM 640 stores beforehand a code embedding program 640a.

As shown in FIG. 15, the CPU 650 reads the code embedding program 640a from the ROM 640 and executes the read code embedding program 640a, thereby causing the code embedding program 640a to function as a code embedding process 650a. The CPU 650 embeds codes into the facial area of the facial image, generates the certificate data, and causes the printer to print the certificate.

If the computer 600 is the verifying device, the ROM 640 stores therein the code verifying program that includes functions similar to the verifying devices 300 and 400 explained in the embodiments. In other words, as shown in FIG. 15, the ROM 640 stores beforehand a code verifying program 640b.

As shown in FIG. 15, the CPU 650 reads the code verifying program 640b from the ROM 640 and executes the read code verifying program 640b, thereby causing the code verifying program 640b to function as a code verifying process 650b. The CPU 650 reads from the RAM 620 verification data 630a that is stored in the HDD 630, determines whether codes embedded into the facial area are included in the verification data 620, and displays the determination result in the display device.

According to an aspect of the present invention, it becomes possible to prevent severe image deterioration due to embedding of data, thereby making falsification of certificates difficult.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image printing device comprising:
    a splitting unit that splits an image of a head of a person including a face of the person into a plurality of blocks;
    a feature-quantity extracting unit that extracts an average density of yellow component of each of the blocks;
    an embedding unit that embeds data into each of the blocks based on a difference between average densities of yellow component of that block and at least one adjacent block; and
    a printing unit that prints data embedded blocks to obtain a data embedded image.

2. The image printing device according to claim 1, further comprising an extracting unit that extracts a specific region from the image such that an area of the specific region exceeds a predetermined percentage of the image, wherein
    the splitting unit splits the specific region into a plurality of blocks,
    the feature-quantity extracting unit extracts a feature quantity of each of the blocks,
    the embedding unit embeds data into each of the blocks based on a difference between feature quantities of that block and at least one adjacent block.

3. The image printing device according to claim 2, where the specific region is face.

4. A verifying device that determines whether data is embedded into an image, the verifying device comprising:
    an extracting unit that extracts an image of a facial portion of a person from an image of a head of the person;
    a determining unit that determines whether data is embedded into the facial portion extracted by the extracting unit;
    a storing unit that stores therein unique verification data;
    a data extracting unit that, upon the determining unit determining that data is embedded into the facial portion, extracts data embedded into the facial portion; and
    a verifying unit that compares data extracted by the data extracting unit with the verification data in the storing unit and determines that the facial portion corresponds to a face of an authentic user when there is match between the data extracted by the data extracting unit and the verification data.

5. The verifying device according to claim 4, further comprising an output unit that outputs a result of determination obtained by the determining unit.

6. A printed material comprising an image printing portion for printing an image of a head of a person including a face of the person, an area of the face exceeding a predetermined percentage of an area of the image, wherein the image is divided into a plurality of blocks and data is embedded, by a processor, into each of the blocks based on a difference between feature quantities of that block and at least one adjacent block.

7. The printed material according to claim 6, wherein the feature quantity is average density of yellow component.

8. An image printing method comprising:
    splitting, using a processor, an image of a head of a person including a face of the person into a plurality of blocks;
    extracting, using a processor, an average density of yellow component of each of the blocks;
    embedding, using a processor, data into each of the blocks based on a difference between average densities of yellow component of that block and at least one adjacent block; and
    printing, using a processor, data embedded blocks to obtain a data embedded image.

* * * * *